(12) United States Patent
Eckert et al.

(10) Patent No.: US 7,300,376 B2
(45) Date of Patent: Nov. 27, 2007

(54) ELECTROMAGNETIC SELECTION DEVICE FOR A TWO-STAGE PLANETARY GEAR SET

(75) Inventors: Harald Eckert, Meckenbeuren (DE); Manfred Auer, Zoznegg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 126 days.

(21) Appl. No.: 10/527,734

(22) PCT Filed: Aug. 30, 2003

(86) PCT No.: PCT/EP03/09648

§ 371 (c)(1),
(2), (4) Date: May 3, 2005

(87) PCT Pub. No.: WO2004/023004

PCT Pub. Date: Mar. 18, 2004

(65) Prior Publication Data

US 2006/0052204 A1    Mar. 9, 2006

(30) Foreign Application Priority Data

Sep. 5, 2002    (DE) ................................. 102 41 006

(51) Int. Cl.
*F16H 48/06*    (2006.01)
(52) U.S. Cl. ...................... 475/156; 475/154; 475/293; 475/298; 475/322; 475/330; 192/3.52
(58) Field of Classification Search ................ 475/154, 475/156, 293, 298, 317, 320, 321, 322, 330; 192/3.52, 18 B, 84.92
See application file for complete search history.

(56) References Cited

U.S. PATENT DOCUMENTS

| | | | | |
|---|---|---|---|---|
| 2,420,553 A | * | 5/1947 | Morrill | 475/154 |
| 4,484,495 A | | 11/1984 | Mason | |
| 4,592,251 A | * | 6/1986 | Mason | 475/157 |
| 5,045,036 A | | 9/1991 | Reuter et al. | |
| 5,358,456 A | * | 10/1994 | Deppert et al. | 475/154 |
| 6,248,038 B1 | * | 6/2001 | Nilsson et al. | 475/286 |
| 6,428,442 B1 | * | 8/2002 | Turgay et al. | 475/321 |
| 6,605,019 B1 | * | 8/2003 | Eckert | 475/299 |

FOREIGN PATENT DOCUMENTS

| | | |
|---|---|---|
| AT | 134156 | 7/1933 |
| DE | 1 107 460 | 5/1961 |
| DE | 1 202 599 | 10/1965 |

(Continued)

*Primary Examiner*—David D. Le
(74) *Attorney, Agent, or Firm*—Davis Bujold & Daniels, P.L.L.C.

(57) ABSTRACT

An electromagnetic selection device of a two-stage planetary gear set (1) having one input shaft (2) and one output shaft (3), one sun gear (8), one ring gear (11), one planet carrier (10) with planetary gears (9), one transmission housing (6) and one sliding sleeve (14) for switching one first gear in which the ring gear (11) can be coupled with the housing (6) and one second gear in which the ring gear (11) can be coupled with the sun gear (8), the sliding sleeve (14) being movable by way of one electromagnet consisting of magnet coils (22, 23) and one armature (24). It is proposed that the armature (24) be situated rotatably, but axially fixed, upon the sliding sleeve (14).

12 Claims, 2 Drawing Sheets

FOREIGN PATENT DOCUMENTS

| | | |
|---|---|---|
| DE | 41 40 320 A1 | 6/1992 |
| DE | 199 17 673 A1 | 10/2000 |
| DE | 41 40 320 C2 | 7/2002 |
| EP | 0 475 504 A2 | 3/1992 |
| FR | 590.050 | 6/1925 |
| GB | 668902 | 3/1952 |
| WO | WO 0063589 A1 * | 10/2000 |

* cited by examiner

ELECTROMAGNETIC SELECTION DEVICE FOR A TWO-STAGE PLANETARY GEAR SET

This application is a national stage completion of PCT/EP2003/009648 filed Aug. 30, 2003 which claims priority from German Application Serial No. 102 41 006.2 filed Sep. 5, 2002.

FIELD OF THE INVENTION

The invention relates to an electromagnetic selection device for a two-stage planetary gear set.

BACKGROUND OF THE INVENTION

The electromagnetic selection device made known by DE-A 199 17 673 consists of one electromagnet located outside the housing of the planetary gear set and having one movable armature, the movements of which are transmitted from outside via a lever mechanism by the transmission housing to a sliding sleeve situated in the transmission housing. By the electromagnetic lever mechanical control, the sliding sleeve is moved to a first and to a second switch position in which with the housing are coupled either ring gear and sun gear for a direct through drive from input to output or the ring gear to achieve a ratio. The already known device has more potentials with regard to compact design and play-free transmission of motion. The housing aperture needed for the lever mechanism and sealing problems associated therewith are not advantageous.

The problem on which the instant invention is based is to improve an electromagnet selection device of the kind mentioned above with regard to a compact and closed design and to a transmission mechanism as play free as possible, specially between electromagnet and sliding sleeve.

It is of advantage here that any lever mechanism for motion transmission between electromagnet and sliding sleeve is eliminated thereby reducing the number of parts, since the armature is directly fastened—via a bearing—upon the sliding sleeve. Eliminated is also any play necessarily associated with a lever mechanism. Since the armature is situated within the transmission housing an aperture is eliminated and therewith a possible point of leakage in the wall of the transmission housing.

SUMMARY OF THE INVENTION

In an advantageous development of the invention, the armature is designed as an annular part, that is, it engages over its whole periphery on the sliding sleeve—an eventual misalignment being thus extensively ruled out.

According to an advantageous development of the invention, the armature has slopes which correspond with slopes of counterparts of the armature, that is, the armature forms with its counterparts a sliding cone. The armature slopes minimize over the sliding path the air gap between armature counterpart and armature. Thereby is achieved the advantage of a uniform electromagnetic tightening force (constant tension flow over the whole switching path).

According to one other advantageous development of the invention, the whole electromagnetic selection device is designed as front-mounted structural part which is inserted in the transmission housing where it is fastened. This adds advantages both in assembly and production and also the advantage of a compact closed design for the entire planetary gear set. The sliding sleeve is encased by the structural unit thus reducing churning losses.

According to another advantageous development of the invention, to the prefabricated structural unit is added on its front side one brake disc with inner coupling gears which together with the structural unit is inserted in the transmission housing where it is fastened. Sliding sleeve and brake disc, the respective coupling teeth of which correspond with each other, are thus already centered during the assembly.

BRIEF DESCRIPTION OF THE DRAWINGS

The invention will now be described, by way of example, with reference to the accompanying drawings in which.

DETAILED DESCRIPTION OF THE INVENTION

Figure 1:
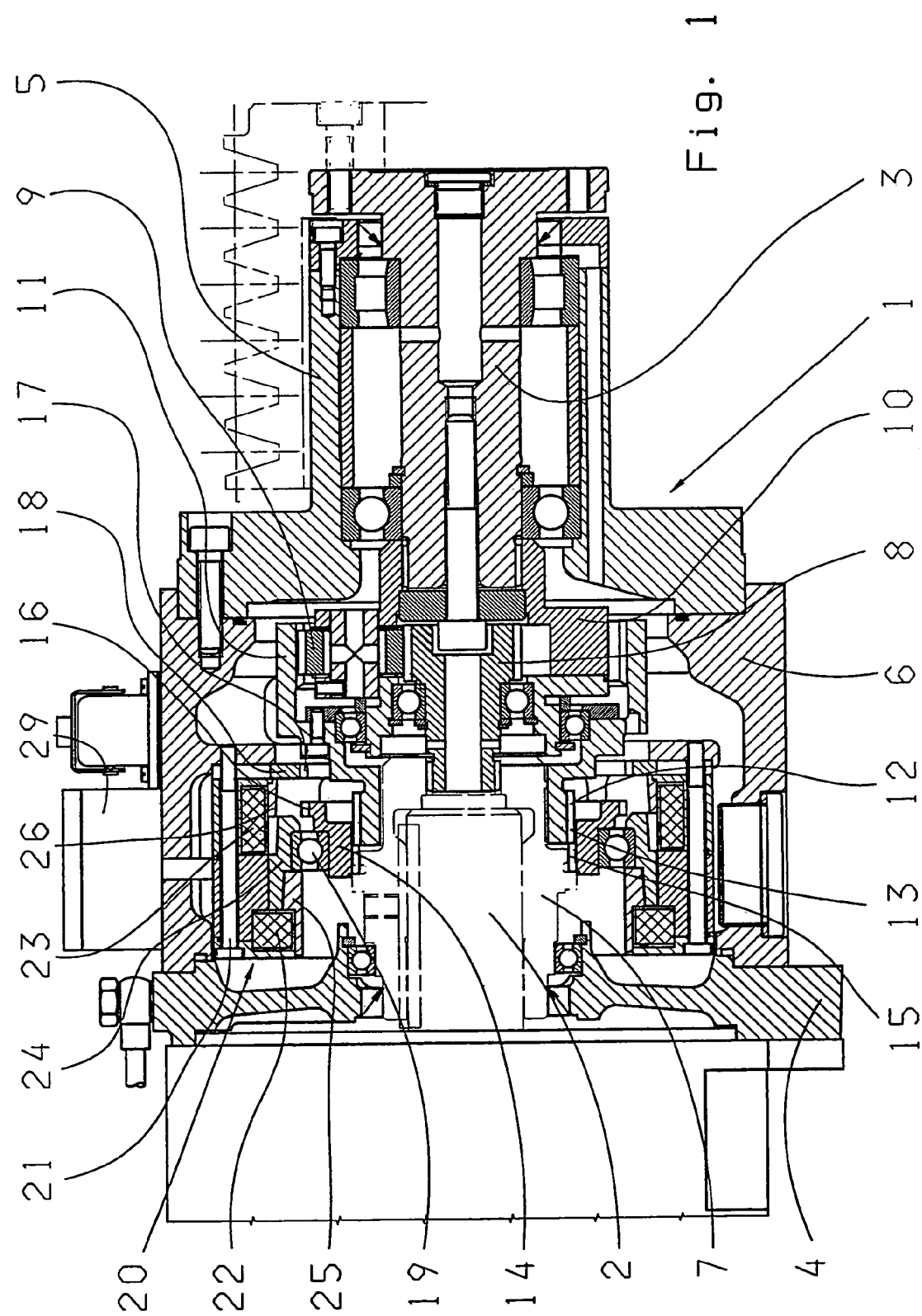
FIG. 1 is section through a planetary gear set with selection device.

FIG. 1 shows a two-stage planetary gear set 1 with one input shaft 2 a one output shaft 3 supported on respective covers 4, 5 of a transmission housing 6. The input shaft 2 is positively connected via a driving sleeve 7 with a sun gear 8 which meshes with planetary gears 9 of a planet carrier 10 which for its part is positively connected with the output shaft 3. The planetary gears 9 mesh with a ring gear 11 which is rotatably supported relative to the planet carrier 10 or the sun gear 8. The ring gear 11 has an outer coupling gearing 12 which can be made to engage with, or disengage from, an inner coupling gearing 13 of a sliding sleeve 14. The sliding sleeve 14 can further be made to engage with, or disengage from, an outer coupling gearing 15 of the driving sleeve 7. The sliding sleeve 14 has also an outer coupling gearing 16 which by axial displacement of the sliding sleeve 14 can be made to engage with, or disengage from, an inner coupling gearing 17 of a brake disc 18 fixed to the housing. The sliding sleeve 14 supports itself, via a grooved ball bearing 19, opposite to an electromagnetic selector unit 20 which, by way of fastening bolts 21, together with the brake disc 18 is fastened on the transmission housing 6 coaxially to the input shaft 2.

The selector unit 20, more specifically described herebelow, controls the axial motion of the sliding sleeve 14 for three positions, that is, a neutral position and two switch positions. In the first switch position, shown in the drawing, the sliding sleeve 14 couples the ring gear 11 and the driving sleeve 7; in this "direct gear" the reduction ratio is 1:1. To reach the second switch position, the sliding sleeve 14 is axially moved to the right by the selector unit 20 until the outer coupling gears 16 engage with the inner coupling gears 17 of the brake disc 18. The ring gear 11 is then decelerated or held stationary relative to the housing 6 via the sliding sleeve 14. The rotational speed of the input shaft 2 is then geared down.

The sliding sleeve 14 has on its external periphery grooves (not shown) in which locking bolts engage to keep the sliding sleeve 14 in one of the switch positions.

The locking bolts are movable by an electromechanical actuation unit 29 radially to the transmission main axle where they engage under tension in the grooves and, by an electromagnet of the actuation unit 29, are drawn radially outwards so as to unlock the sliding sleeve 14.

The electromagnets of the selector unit and of the actuation unit 29 must, therefore, be controlled, that is, supplied with current, only when a selection process is being carried out. Aside from switchings the locking unit prevents an unintended displacement of the sliding sleeve 14.

The selector unit 20 has two magnet coils 22, 23 between which an armature 24, designed as an annular part, is axially movably disposed. With the armature 24 are coordinated one left armature counterpart 25 and one right armature counterpart 26, respectively, in the area of the left magnet coil 22 and of the right magnet coil 23. The armature 24 is fixedly connected with the outer ring of the grooved ball bearing 19, that is, the axial motion of the armature 24 is transmitted directly to the sliding sleeve 14. Herebelow is described the exact structure of the selector unit 20.

Figure 2:
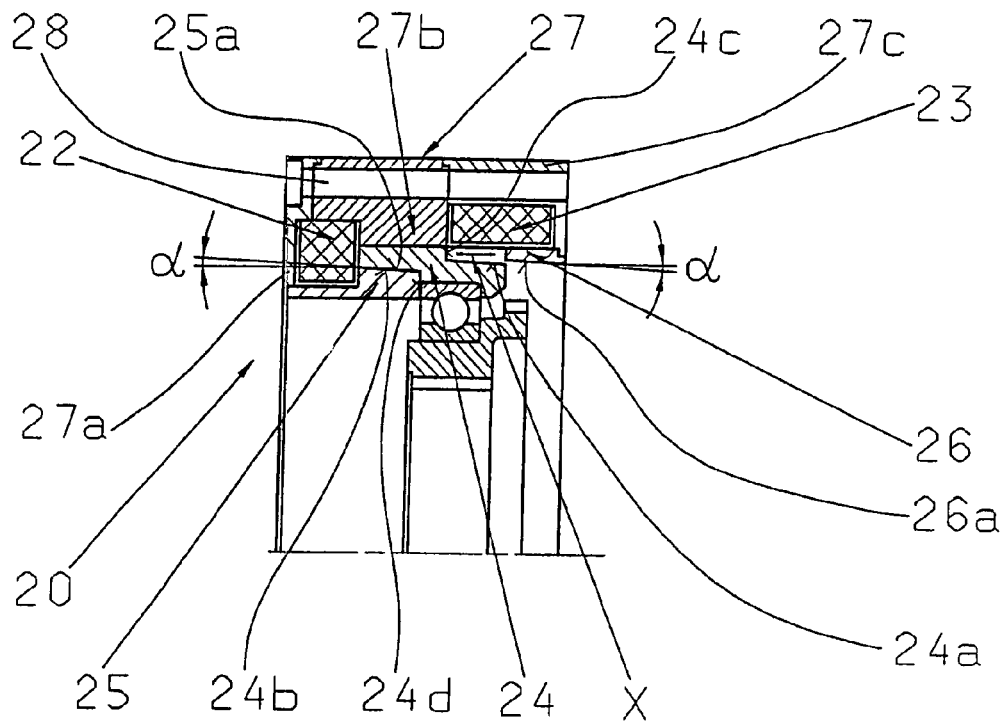
FIG. 2 is a separate representation of the electromagnetic selection device of FIG. 1.

FIG. 2 shows in enlarged representation of the selector unit 20 of FIG. 1, the reference numerals of FIG. 1 having been adopted. The left magnet coil 22 substantially quadratically designed in cross-section and the right magnet coil 23 rectangularly designed in cross-section are accommodated and held together by a magnet body 27 consisting of three joined parts 27a, 27b, 27c. This results via the fastening bolts 21 (shown in FIG. 1), which are plugged through a piercing hole 28 of the magnet body 27. On the magnet body 27 are, likewise, fastened the two armature counterparts 25 and 26. The armature 24 of annular design has one right outer slope 24a and one left inner slope 24b, that are, respectively, conical annular surfaces. The right armature counterpart 26 has a corresponding slope 26a and the left armature counterpart 25 has a corresponding slope 25a, that are, likewise conical annular surfaces. The angle α of said armature slope or of the cone amounts to about 3 degrees. The armature slope 24a is limited in direction of the armature center by a front surface 24c while the armature slope 24b terminates on an inner front surface 24d. These two front surfaces 24c, 24d, extending perpendicular to the axis of rotation, serve as a stop in the axial motion of the armature 24. The switch stroke covered by the armature 24 between the two switch positions is designed with x. The air gap is minimized by the armature slopes 24a, 24b and the corresponding slopes 26a, 25a on the armature counterparts 26, 25, thereby resulting a substantially constant course of the magnetic tightening force upon the armature 24.

The selector unit 20 operates so that either the left magnet coil 22 for movement of the armature 24 to the left or the right magnet coil 23 for movement of the armature 24 to the right is supplied with current. By virtue of the above mentioned constant traction flow, there immediately results, upon a reversal, the full magnetic tightening force upon the armature 24.

Figure 3A:
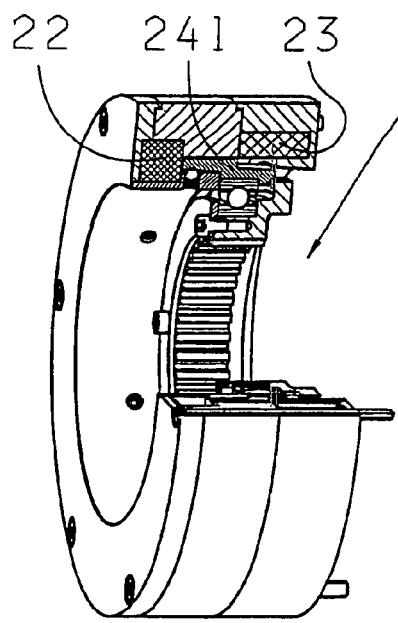
FIGS. 3A and 3B are each a perspective representation of the electromagnetic selection device as pre-assembled structural unit.
Figure 3B:
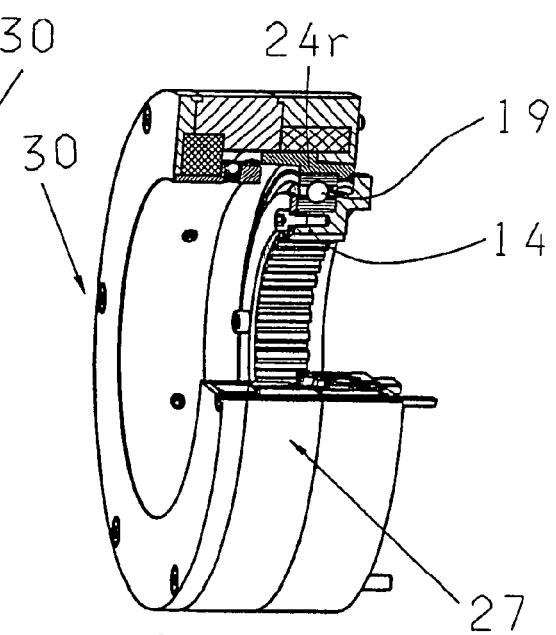

FIGS. 3A and 3B each show a representation in perspective of the above described selector unit 20 as a complete front-mounted structural unit 30 in two representations with different switch positions. The left figure (FIG. 3A) corresponds to the representation in FIG. 2, that is, the armature 24*l* is in its left position. The right figure (FIG. 3B), on the other hand, shows the armature 24*r* in its right position. The selector unit, shown in FIG. 2, is completed by the bearing 19 and the selector sleeve 14. Together with the magnet coils 22, 23, the armature 24 and the magnet body 27, these parts result together in the compact structural unit 30 introduced as such in the gear set shown in FIG. 1 and fastened there. From the representation can be easily noted that the sliding sleeve 14 is encased and thus cannot cause much churning losses.

| Reference numerals | |
|---|---|
| 1 | planetary gear set |
| 2 | input shaft |
| 3 | output shaft |
| 4 | housing cover |
| 5 | housing cover |
| 6 | transmission housing |
| 7 | driving sleeve |
| 8 | sun gear |
| 9 | planetary gear |
| 10 | planet carrier |
| 11 | ring gear |
| 12 | outer coupling gearing (part 11) |
| 13 | inner coupling gearing (part 14) |
| 14 | sliding sleeve |
| 15 | outer coupling gearing (part 7) |
| 16 | outer coupling gearing (part 14) |
| 17 | inner coupling gearing (part 18) |
| 18 | brake disc |
| 19 | grooved ball bearing |
| 20 | selector unit |
| 21 | fastening bolts |
| 22 | magnet coil, left |
| 23 | magnet coil, right |
| 24 | armature |
| 24a | armature slopes |
| 24b | armature slopes |
| 24c | front surface |
| 24d | front surface |
| 24l | armature, left nosition |
| 24r | armature, right Dosition |
| 25 | armature counterpart, left |
| 24a | slopes (part 24) |
| 26 | armature counterpart, right |
| 27 | magnet body |
| 27a | magnet body |
| 27b | magnet body |
| 27c | magnet body |
| 28 | through hole |
| 29 | electromagnetic actuating unit |
| 30 | front-mounted structural unit |

The invention claimed is:

1. A two-stage planetary gear set (1) having:
an input shaft (2) and an output shaft (3),
a sun gear (8), a ring gear (11), and a planet carrier (10) with planetary gears (9),
a transmission housing (6), and
an electromagnetic selection device having a sliding sleeve (14) for switching a first gear, in which the ring gear (11) can be coupled with the housing (6), and a second gear, in which the ring gear can be coupled with the sun gear (8), the sliding sleeve (14) being displaceable by an electromagnet comprising magnet coils (22, 23) and an armature (24),
wherein a bearing (19) directly connects the armature (24) to the sliding sleeve (14) such that the armature (24) is axially fixed to the sliding sleeve (4) but the sliding sleeve (4) is rotatable relative to the armature (24).

2. The planetary gear set according to claim 1, wherein the magnet coils (22, 23) are located within the transmission housing (6).

3. The planetary gear set according to claim 1, wherein the armature (24) an annular part which surrounds the sliding sleeve (14).

4. The planetary gear set according to claim 3, wherein the magnet coils (22, 23), the armature (24) with the bearing (19), the sliding sleeve (14), and armature counterparts (25, 26) are accommodated in a magnet body (27) which is a front-mounted structural unit (30) that is inserted in the transmission housing (6).

5. The planetary gear set according to claim 4, wherein on a front side (27c) of the structural unit (30) is situated a brake disc (18) provided with an inner coupling gearing (17) which together with the structural unit (30) is fastened to the transmission housing (6).

6. A two-stage planetary gear set (1) comprising:
an input shaft (2) and an output shaft (3);
a sun gear (8), a ring gear (11) and a planet carrier (10) having planetary gears (9);
a transmission housing (6); and
an electromagnetic selection device having a sliding sleeve (14) for switching a first gear, in which the ring gear (11) can be coupled with the housing (6), and a second gear, in which the ring gear can be coupled with the sun gear (8), the sliding sleeve (14) being displaceable by an electromagnet comprising magnet coils (22, 23) and an armature (24);
wherein the armature (24) is situated rotatably but axially fixed upon the sliding sleeve (4);
the armature (24) is an annular part which is fastened by upon the sliding sleeve (14) via a bearing (19);
the armature (24) has an outer and, axially offset, an inner slope (24a, 24b) with which are respectively coordinated with a slope of outer and inner armature counterparts (26, 25), and the slopes of the armature and the armature counterparts each form a sliding cone.

7. The planetary gear set according to claim 6, wherein an angle ($\alpha$) of the slopes of the armature and of the cone amounts to about 3 degrees.

8. The planetary gear set according to claim 6, wherein the armature slopes (24a, 24b) are delimited by annular front faces (24c, 24d) which act as stop surfaces defining end positions of the armature (24).

9. A two-stage planetary gear set (1) comprising:
an input shaft (2) and an output shaft (3);
a sun gear (8), a ring gear (11), and a planet carrier (10) having rotatable planetary gears (9);
a transmission housing (6); and
an electromagnetic selection device having a sliding sleeve (14) for selectively engaging a first gear, in which the ring gear (11) is coupled with the housing (6), and a second gear, in which the ring gear is coupled with the sun gear (8), and the sliding sleeve (14) being displaceable by an electromagnet comprising magnet coils (22, 23) and an armature (24);
wherein a bearing (19) directly connects the armature (24) to the sliding sleeve (4) such that the sliding sleeve (4) is fixed to and moves axially along with the armature (24) while the bearing (19) facilitates relative rotation between the sliding sleeve (4) and the armature (24).

10. The planetary gear set according to claim 9, wherein the armature surrounds the sliding sleeve (4) and is located between the sliding sleeve (4) and the transmission housing (6).

11. The planetary gear set according to claim 9, wherein the armature (24) has an exterior outer slope and an interior inner slope (24a, 24b) which facilitate axially movement of the sliding sleeve (4).

12. The planetary gear set according to claim 9, wherein the armature surrounds the sliding sleeve (4) and is located between the sliding sleeve (4) and the transmission housing (6); and
the armature (24) has an exterior outer slope and an interior inner slope (24a, 24b) which facilitate axially movement of the sliding sleeve (4).

* * * * *